United States Patent [19]
Jackson et al.

[11] Patent Number: 5,621,658
[45] Date of Patent: Apr. 15, 1997

[54] METHOD AND APPARATUS FOR COMMUNICATING AN ELECTRONIC ACTION FROM A DATA PROCESSING SYSTEM TO ANOTHER DATA PROCESSING SYSTEM VIA AN AUDIO DEVICE

[75] Inventors: Brion K. Jackson, Flower Mound; Paul L. Miller, Irving; William E. Warren, III, Richland Hills; Marvin L. Williams, Lewisville, all of Tex.

[73] Assignee: International Business Machines Corporation, Armonk, N.Y.

[21] Appl. No.: 90,731

[22] Filed: Jul. 13, 1993

[51] Int. Cl.$^6$ ........................................... G06F 17/00
[52] U.S. Cl. ........................................... 364/514 R
[58] Field of Search ............... 364/514, 952.4, 364/952.5, 952.6, 514 R; 379/88, 67, 73, 75; 369/27, 28, 32; 395/2.84; 381/52

[56] References Cited

U.S. PATENT DOCUMENTS

| | | | |
|---|---|---|---|
| 2,721,990 | 10/1955 | McNaney | 364/952.5 |
| 2,771,596 | 11/1956 | Bellamy | 364/952.6 |
| 3,129,321 | 4/1964 | Rogal | 364/952.6 |
| 3,293,613 | 12/1966 | Gabor | 364/952.5 |
| 4,128,737 | 12/1978 | Dorais | 395/1.84 |
| 4,319,337 | 3/1982 | Sander et al. | 364/952.6 |
| 4,581,485 | 4/1986 | Bond et al. | 379/75 |
| 5,241,586 | 8/1993 | Wilson et al. | 379/88 |
| 5,301,228 | 4/1994 | Kakigi et al. | 379/73 |

OTHER PUBLICATIONS

Ades et al; "Voice Annotation and Editing Workstation Environment." Xerox 1986.
Ruiz; "Voice and Telephony Applications for the Office Workstation"; IEEE 1985.
Terry et al; "Managing Stored Voice in the Ethorphone System."; Xerox 1986.

*Primary Examiner*—Ellis B. Ramirez
*Attorney, Agent, or Firm*—Geoffrey A. Mantooth

[57] ABSTRACT

An action contained within an electronic mail object is communicated from a data processing system to another data processing system via an audio device. The action is executable on a data processing system. At the sending data processing system, the action is converted to a predetermined audio pattern. The electronic mail object may contain text in addition to an action. The text is also converted to an audio pattern. The audio patterns are then communicated to the audio device over telephone lines or other communication medium. At the receiving end, the audio device records the object. A user can provide the recorded object to a data processing system, which then executes the action and converts the text audio patterns back to text. In addition, the action can be converted to text and displayed on the data processing system.

21 Claims, 4 Drawing Sheets

METHOD AND APPARATUS FOR COMMUNICATING AN ELECTRONIC ACTION FROM A DATA PROCESSING SYSTEM TO ANOTHER DATA PROCESSING SYSTEM VIA AN AUDIO DEVICE

TECHNICAL FIELD OF THE INVENTION

The present invention relates to sending information from one data processing system to another data processing system via an audio device.

BACKGROUND OF THE INVENTION

Electronic mail has become a common manner in which to communicate. A user of one data processing system or computer is able to electronically send messages, documents, etc. to a second user of another computer. The communication may be made over computer network lines, telephone lines, etc.

Users often send electronic mail to remote users who do not have access to a computer when the electronic mail is sent. This is because advancements in electronic mail allow a recipient to have electronic mail routed to several media devices. For example, a traveling recipient may have electronic mail routed to a telephone answering machine. To recover the electronic mail, the user can either play the electronic mail on the answering machine, or load it onto a computer.

It is often desirable to send actions, or instructions for a computer, in an electronic mail object. In the prior art, there is a method and apparatus for providing actions in electronic mail. The provision of an action in a piece of electronic mail saves the recipient the task of having to perform numerous and sometimes unknown keystrokes to implement the action. The user need only select the action in the piece of electronic mail for the receiving computer to execute the action.

Unfortunately, in the prior art, there is no way to send actions by electronic mail to a multimedia device, which device is not a computer. In the example discussed above, where the multimedia device is a telephone answering machine, a telephone message is typically recorded on audio tape. This precludes the recordation and subsequent use of actions in a piece of electronic mail transmitted to the answering machine. Recordation of actions contained within electronic mail would allow the recipient to subsequently play the recording to a computer and implement one or more of the actions.

SUMMARY OF THE INVENTION

It is an object of the present invention to provide a method and apparatus for transposing actions in electronic mail to a format that can be received by a multimedia device that is not a computer.

The present invention communicates an electronic mail object from a data processing system to an audio device by determining if the object includes an action that is executable on a data processing system. If the object includes an action, then the action is converted into a predetermined audio pattern and the audio pattern is communicated to the audio device.

In one aspect of the present invention, the action in the object is represented as text. Cues are provided to separate the action from other portions of said object, which said other portions comprise text. The cues allow identification of the action.

In still another aspect of the present invention, the audio pattern is converted into the action after the audio pattern is communicated to the audio device. In still another aspect, after the audio pattern is communicated to the audio device, the action is executed on a data processing system. In still another aspect, after the audio pattern is communicated to the audio device, the audio pattern is converted to text.

In still another aspect of the present invention, an electronic mail object is communicated from a data processing system to an audio device. The electronic mail object has a text portion and an action portion, with the action portion having an action that is executable on a data processing system. The text portion is converted into a first audio pattern. The action is converted into a second audio pattern. Then, the first and second audio patterns are communicated to an audio device.

The present invention determines if the action portion is to be correlated with the text portion and if not then relocates the second audio pattern so as to be appended to the first audio pattern when the first and second audio patterns are communicated.

The present invention allows one user to utilize electronic mail to send actions, in addition to sending text, to recipients by way of an audio device. With the exception of the audio device, the recipient may be frequently out of communication with a sender's data processing system. By providing an audio device such as a telephone answering machine, the recipient can maintain communications with a data processing system and receive electronic mail. The present invention allows actions that can be executed on a data processing system to be sent to the recipient through the audio device.

The present invention allows a sender to construct an electronic mail object with actions in easy-to-understand text and to commingle action text with nonaction text through the use of action identifying cues. When the object is ready to be communicated, the action text is extracted from the nonaction text and converted into audio patterns. In addition, the order of the action audio patterns relative to the nonaction audio patterns can be changed for communication purposes. The recipient's computer can reextract the action from the communicated audio patterns, execute the action and display the object, including the action, as text.

In addition to enhancing the ability to communicate, the present invention provides security in encoding actions into predetermined audio patterns. The audio patterns can be assigned by the user and kept confidential.

BRIEF DESCRIPTION OF THE DRAWINGS

FIG. 2 shows a registration method for associating actions with audio patterns. FIG. 3 shows a method for converting actions to audio patterns before the communication of an electronic mail object. FIG. 4 shows a method for retrieving and executing actions from audio patterns that have been communicated.

DESCRIPTION OF THE INVENTION

Figure 1:
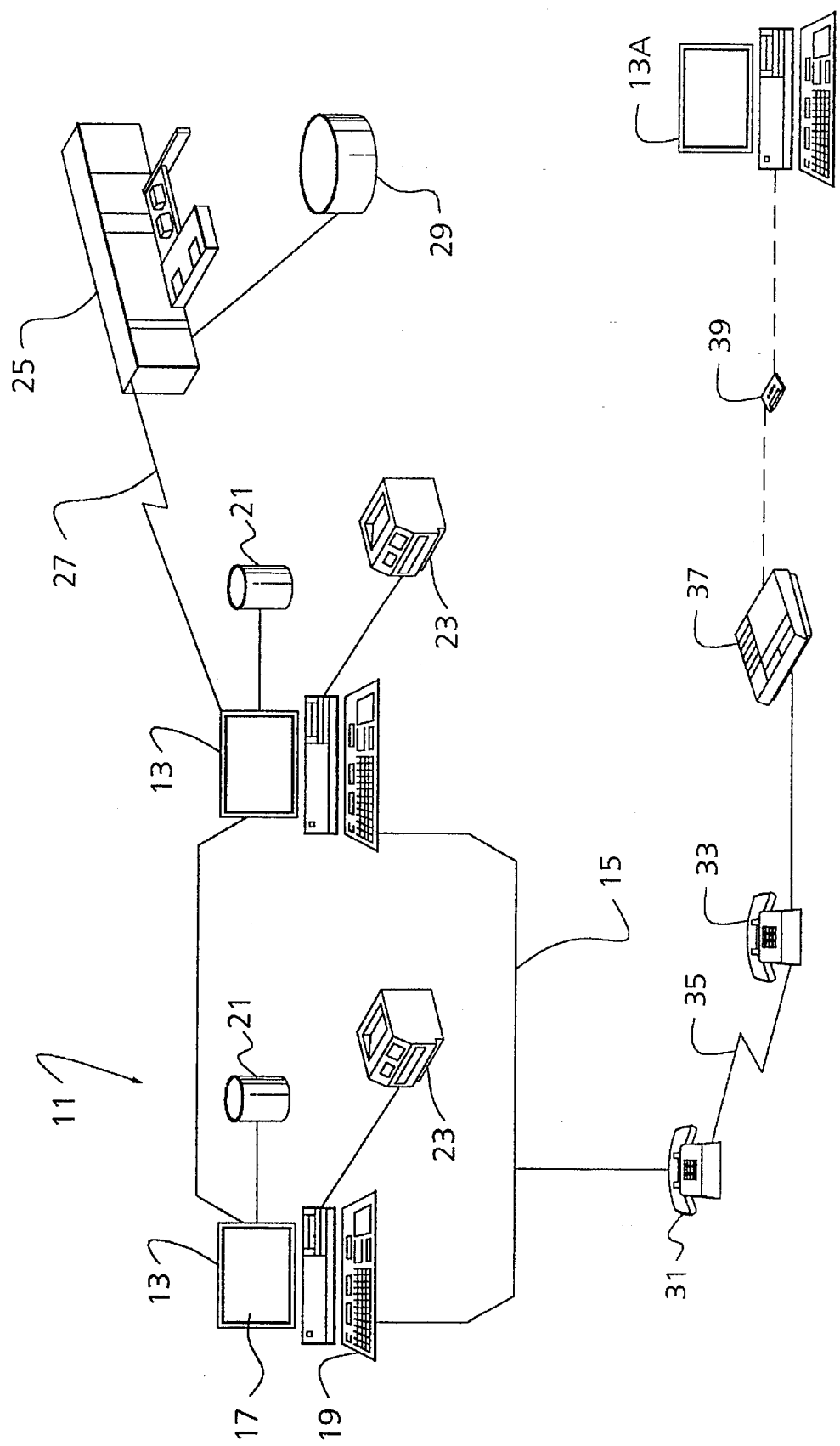
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers or workstations 13 which are connected together in a local area network (LAN) 15. Each workstation 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe or host computer 25 that is coupled to one of the workstations by a communication link 27. The host computer may also be coupled to a storage device 29 which may serve as a remote storage for the computers.

A first telephone 31 is connected to the data processing system 11. Each computer 13 has a modem for communicating over the telephone line 35. The first telephone is connected to a second telephone 33 by a conventional telephone line 35. A telephone answering machine 37 is connected to the second telephone. The answering machine 37 records audio messages directed to the unanswered second telephone 33.

Figure 2:
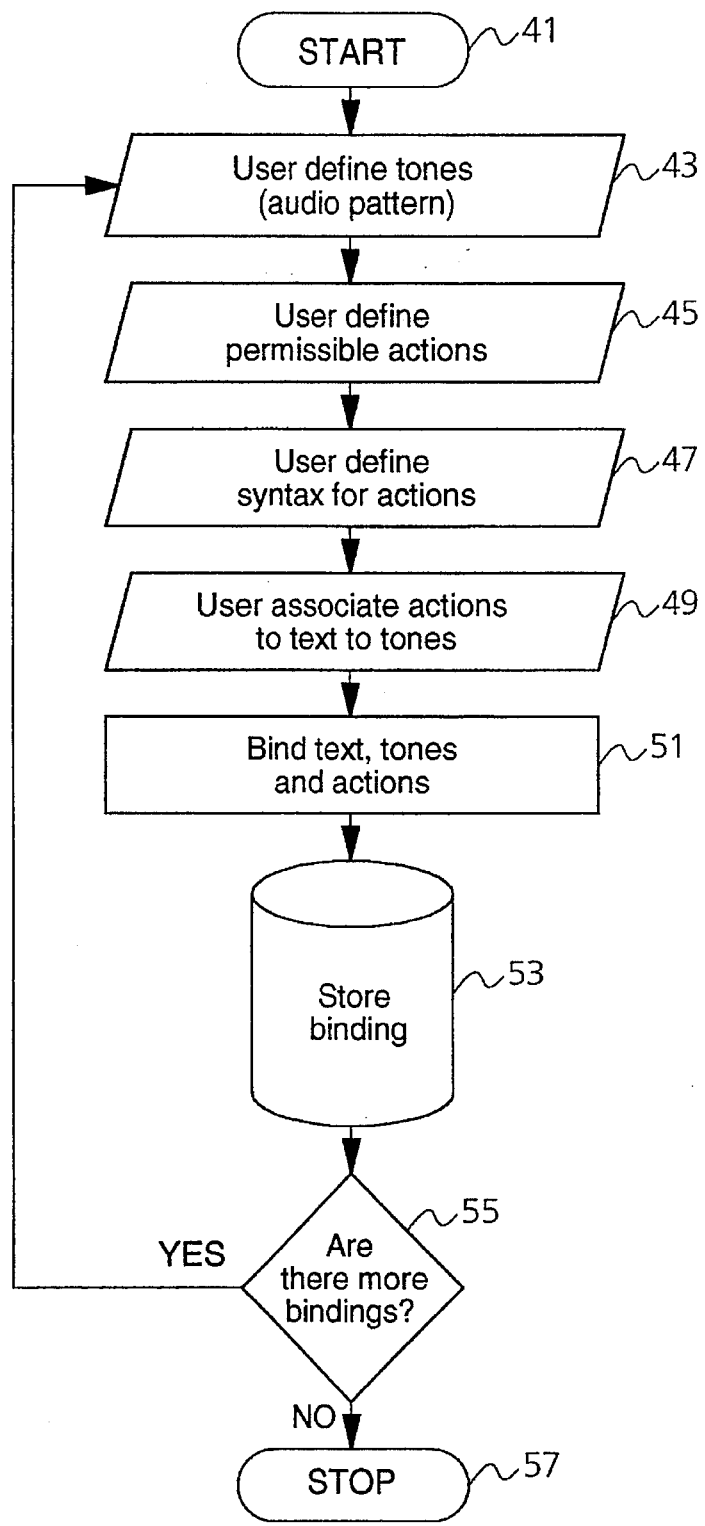
FIGS. 2–4 are flow charts showing the method of the present invention, in accordance with a preferred embodiment.

The present invention allows a first user of one of the computers 13 to send an electronic mail object, such as a note, message, document, etc. to a second user by way of the answering machine 37, or other audio device. A first user composes the electronic mail object on a computer 13. The electronic mail object contains one or more actions which are executable on a data processing system. Such actions may include, for example, storing, deleting or copying data. In addition, the electronic mail object may contain text. In the preferred embodiment, the actions are presented as text to simplify user comprehension of the actions. The text representing an action is separated from nonaction portions of text by delimiters. At some time prior to communicating the object, the actions are associated with audio patterns. The method of FIG. 2 is used to register actions and their associated audio patterns in the first user's computer.

The text (that is, the nonaction text) and the actions in the electronic mail object are converted into an audio format suitable for communicating over the telephone line 35. The method of FIG. 3 converts the text and the actions into audio patterns. This is typically accomplished on the first user's computer 13. The electronic mail object is then communicated by the first user's computer over the telephone line 35 to the telephone 33 and the answering machine 37, which records the object.

The second user may play the object on the answering machine to hear the text (or nonaction) portion of the object. The second user will also hear the action portion of the object, although the action portion will likely be unintelligible to the second user. In addition, the second user can transfer the object from the answering machine to a second computer 13A (FIG. 1), which can be similar to the first user's computer 13. Answering machines typically record messages on magnetic tape 39. The second user can take the casette tape 39 and load its contents into the second computer 13A by way of a tape reading device located in the computer 13A. The second computer converts the electronic mail object from audio back to computer code, using the method of FIG. 4. The second user can then read the text portion of the object and implement the actions contained in the object.

Referring now to the flow charts of FIGS. 2–4, the method of the present invention will be discussed. In the flow charts, the following graphical conventions are observed: a rectangle for either a process or function, a diamond for a decision, a parallelogram for a user input, a display symbol for providing an output to a user, a drum for a storage function and circles for connectors. These conventions are well understood by programmers skilled in the art of computer programming and the flow charts are sufficient to enable a programmer skilled in the art to write code in any suitable computer programming language, such as BASIC, PASCAL or C for a computer such as the IBM Personal System/2 (PS/2) family of computers which supports these languages.

Referring to FIG. 2, the registration method will now be discussed. The method starts, step 41, whenever a user wishes to associate one or more actions with audio patterns. This may be done by the user pressing a well known key. In step 43, the user defines one or more tones or audio patterns. The user typically chooses tones that are not normal in human speech. The range of tones is determined by the communication media being used. If telephone lines are to be used, then the audio tones are within the bandwidth of the telephone network. Higher bandwidths can be achieved by other communication media, such as radio. The tones can be a single tone or plural tones (that is single or plural frequencies). Plural tones can be defined by a user as playing simultaneously or in a time pattern. For example, a tone pattern could be melodic in nature. However, tone patterns need not be melodic or otherwise intelligible to humans.

In step 45, the user defines permissible actions. Thus, the user builds a library of actions for communication to an audio device. Some actions may not be permitted by the organization that operates the data processing system 11. For example, an action deleting all hard disk files may not be permitted. Those actions that are not permitted are not registrable. The method determines a permitted action by comparing the entered action to a table of permitted actions, which table is provided by the administrator of the data processing system.

In step 47, the user defines the syntax for actions. This step allows a user to define an action in terms of text. For example, a delete action could have the following syntax: "del:". In addition, the syntax provides delimiters around actions so that actions can be distinguished from nonactions such as text. For example, an appropriate syntax might be "%%BACKUP%%" where the action "BACKUP" is preceded and succeeded by the delimiter "%%".

In step 49, the user associates specific actions to a specific syntax and to a specific tone or audio pattern. If there is any text related to the action, then the text is associated with the action. In step 51, the method binds the text, tone or audio pattern and actions together and in step 53, the binding is stored. The binding contains the associated text, tones and actions.

In step 55, the method determines if there are more bindings to be made. If YES, then the method returns to step 43. If NO, then the method stops.

The registration method of FIG. 2 may be executed by a user who wishes to send an electronic mail object. Alternatively, the registration method may be performed by a software provider, wherein a software package implementing the present invention provides a library of actions already associated with tones and text. A user could modify such a library to customize it to a particular user's application.

After an electronic mail object is composed, the sending user sends the object. Before the electronic mail object is actually sent, the method of FIG. 3 is started, step 61, in order to convert the actions into tones or audio patterns. In step 63, the method reads the binding definitions in order to be able to recognize actions in the electronic mail object. The binding definitions were earlier stored in step 53 of FIG. 2. In step 65, the method gets the electronic mail or text object. The text in the object is then parsed, step 67. Parsing involves segmenting the text into tokens, which tokens are the smallest units of recognizable annunciation. If an action is encountered during parsing, then the entire action is considered as a single unit or token. The method then takes one unit at a time and proceeds through steps 69 et seq.

In step 69, the method determines if the text of the electronic mail object is to be correlated with the actions. This is determined from an attribute of the electronic mail action. The attribute is set by the sending user, or else may be provided as a default. If the result of step 69 is NO, then the audio patterns representing the actions will be relocated within the electronic mail object upon communication. A typical relocation of actions would involve placing the audio patterns representing the actions at the end of the communicated object. Thus, the text audio patterns (which are represented as speech) would be communicated first, followed by the action audio patterns. Such a relocation would be appreciated by a recipient who listens to the communicated electronic mail object on the answering machine. The actions typically are represented by audio patterns that are unintelligible to humans. If the action audio patterns are not relocated, then the recipient hears the spoken text interspersed with action audio patterns. Thus, these action audio patterns are annoying to listen to. Placing the audio patterns for the actions at the end of an object minimizes the recipient having to listen to the annoying audio patterns while listening to the text portions of the object.

In the preferred embodiment, the relocation would not occur until the electronic mail object is communicated by the sending computer 13. The electronic mail object can be stored within the computer 13 in any order. Pointers to the memory addresses of the stored audio patterns of the electronic mail object are used to located the stored audio patterns within memory.

If the result of step 69 is NO, then the method proceeds to step 71. In step 71, the method determines if the unit of text is an action. The determination is made by referencing the binding definitions. If the result of step 71 is YES, then the method proceeds to step 73 to convert the action to its associated audio pattern. This audio pattern is then stored into a sonogram located in memory, step 75. Pointers to the memory addresses are used. The sonogram is capable of being sent over the telephone line 35. The method then proceeds to step 77.

If the result of step 71 is NO, then the method proceeds to step 79 to determine if the unit of text is a phoneme. If the result of step 79 is NO, then the method proceeds to step 77. If the result of step 79 is YES, then the method proceeds to step 81 to convert the phoneme into its audio pattern. Step 81 is carried out by a conventional text-to-speech conversion. For example, the phoneme "m" is converted into its audio pattern. This audio pattern is then stored, step 75, into a sonogram located in memory. Again, pointers to the memory addresses are used.

If the result of step 69 is YES, the text is to be correlated with the action, then the method proceeds to step 83. In step 83, the method determines if the unit of text is a phoneme (as opposed to an action). If the result of step 83 is YES, then the phoneme is converted into its audio pattern in step 81. After step 81, the audio pattern is stored into a sonogram, step 75.

If the result of step 83 is NO, the unit of text is not a phoneme, then the method proceeds to step 71 to determine if the unit of text is an action and continues to the following steps.

In step 77, the method determines if the unit that has just been processed is the end of the text object. If the result of step 77 is NO, then the method proceeds to step 67 to get the next parsed unit of text. This next unit of text is processed in steps 69 et seq., as discussed above. If the result of step 77 is YES, then the method stops, step 85.

An example will now be described. Suppose that the electronic mail object is as follows:

"John, please back up the hard disk on the 13th of this month, %%BACKUP D:/6-13-1993/13:00%%,Regards Fred."

The object contains an action (BACKUP D:/6-13-1993/13:00) that is delimited by "%% . . . %%". In addition, the object contains two strings of phonemes, namely: "John, please back up the hard disk on the 13th of this month" and "Regards Fred". Suppose also that the sender wishes the action to be uncorrelated with the text, wherein the action will be located at the end of the communicated object.

Figure 3:
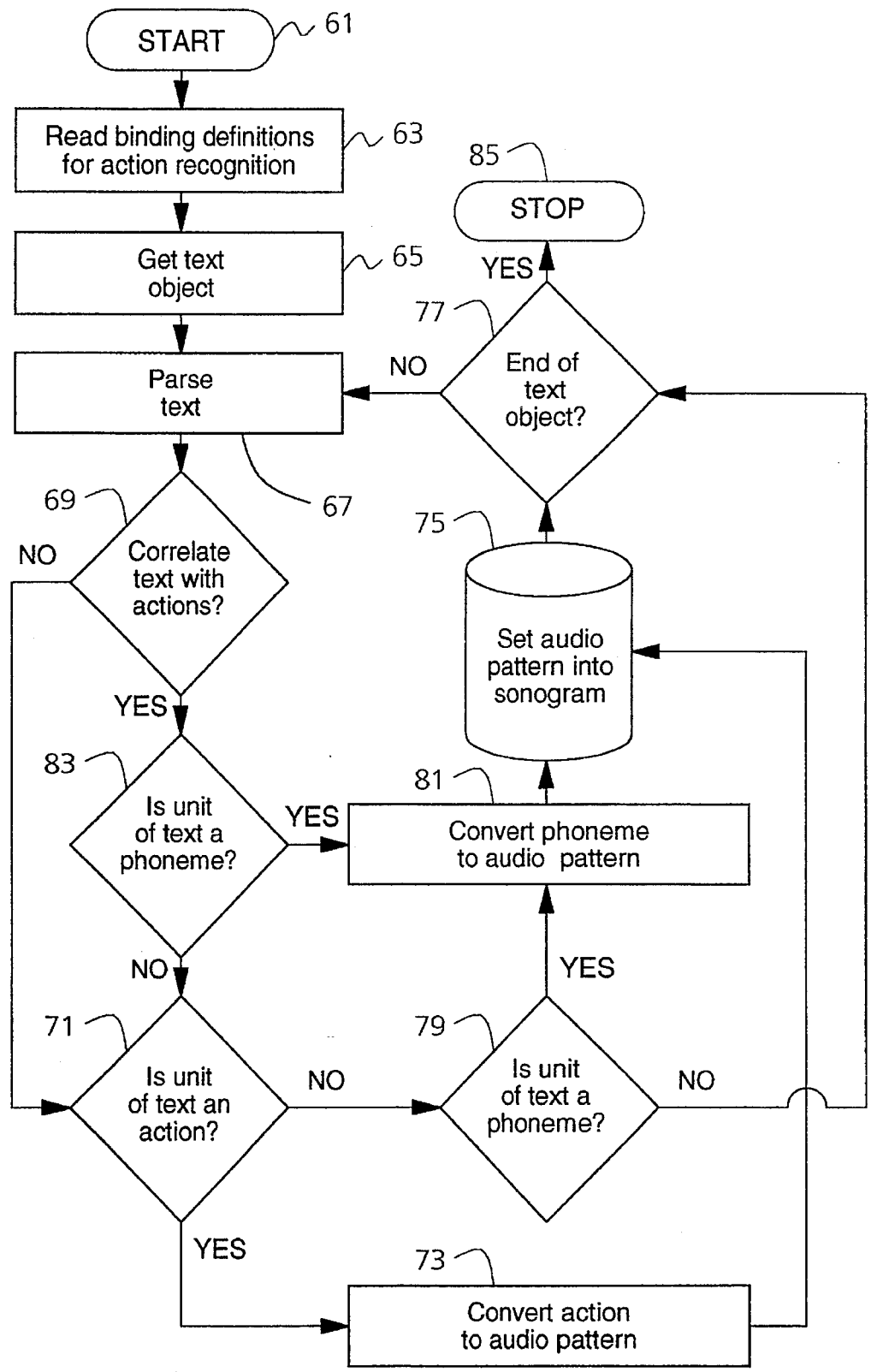

The electronic mail object is processed by the method of FIG. 3. In step 67, the text is parsed, beginning with "John" to produce a first unit of text of "J". In step 69, the result is NO, because the user set the correlate attribute in order to locate the action audio pattern behind the nonaction audio patterns in the communicated object. Thus, the method proceeds to step 71, wherein it is determined that "J" is not an action. The method proceeds to step 79 which determines that "J" is a phoneme. In step 81, the phoneme is converted to an audio pattern that is stored as a sonogram. The method returns to step 67 by way of steps 75 and 77. The steps 67, 69, 71, 79, 81, 75 and 77 are repeated for the remaining phonemes in the first string of text.

Continuing with the example, when the action is parsed, the result of step 71 is YES and the method performs steps 73, 75 and 77 to convert the action to the audio pattern. When step 67 is repeated, the next unit of text is a phoneme, namely "Re" and is processed accordingly The remaining units of text are also processed.

After the electronic mail object has been processed and converted into audio patterns, the object is communicated over the communications channel 35 to the receiving device 37. The phoneme audio patterns of both the first and second strings of phonemes are communicated first. This is accomplished by using the respective pointers to retrieve these audio patterns from memory first. Next, the audio pattern for the action is communicated. This is accomplished by using the respective pointer or pointers and retrieving the action audio pattern from memory for communication over the telephone line.

On the receiving end, the telephone answering machine 37 records the object on audio tape 39. The recipient user removes the tape 39 from the answering machine and inserts it into a computer 13A. The method of FIG. 4 is then executed on the recipient's computer 13A.

Figure 4:
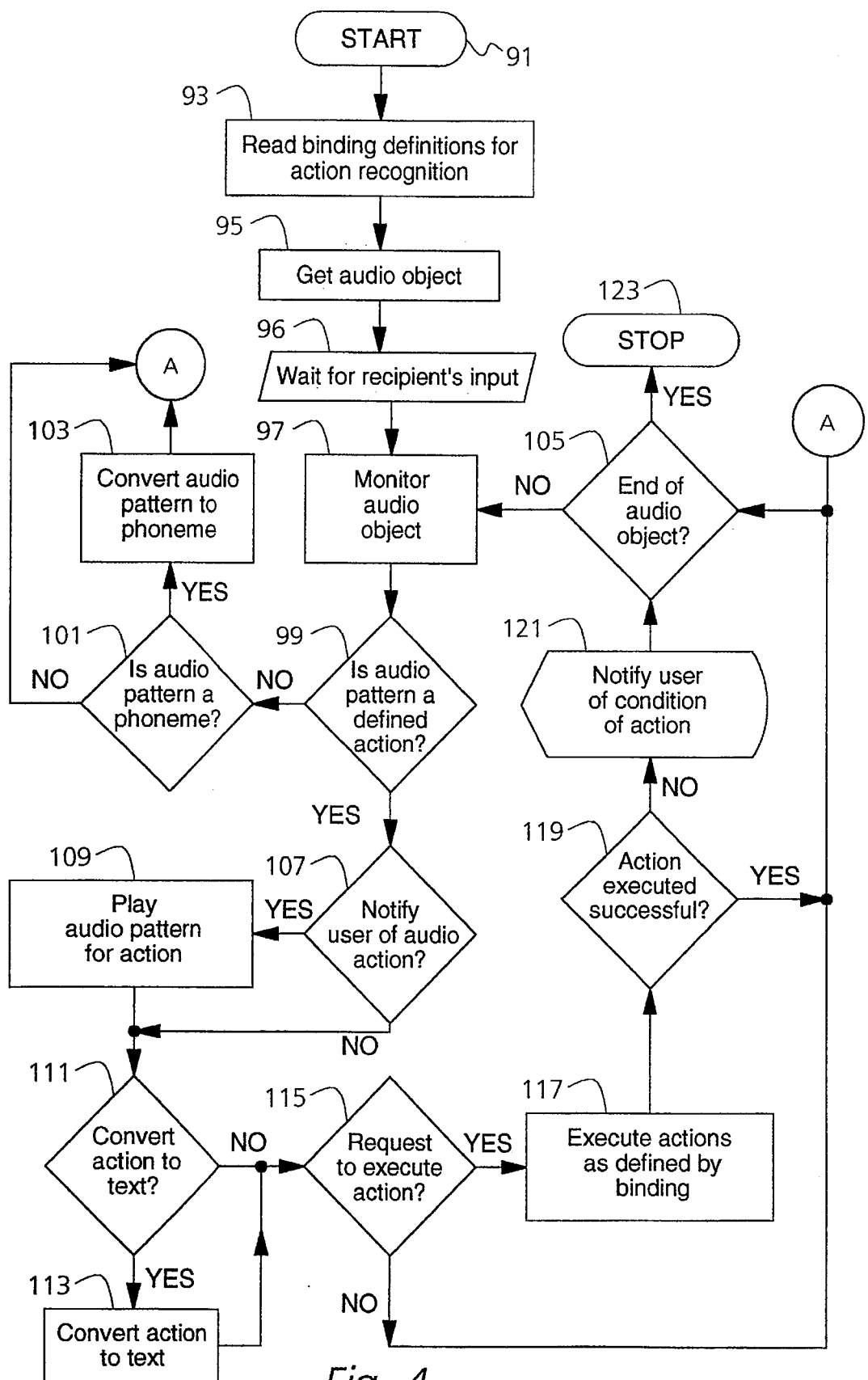

Referring to FIG. 4, the method starts, step 91. In step 93, the binding definitions for action recognition are read. These are the same as the binding recognitions that were stored in step 53 of FIG. 2. Thus, both the sender's computer 13 and the recipient's computer 13A have the same binding definitions stored. In step 95, the method gets the audio object that was communicated.

In step 96, the method waits for an input from the recipient user. This input allows the recipient user to specify how the electronic mail object is to be reconstructed on the computer 13A. For example, the recipient can specify that the action will be displayed as text, so that the recipient can view the entire electronic mail object. The recipient can also specify that the electronic mail object be displayed as communicated. For example, if the action was communicated after the textual strings, then, this order will be maintained when the object is displayed. Alternatively, the action can be relocated to its original position within the objet, to allow the recipient to view the object as it was viewed by the sender.

In step 97, the method monitors the audio object. This is done by reading the object from the audio tape. Each audio pattern is processed in turn by steps 99 et seq.

In step 99, the method determines if the respective audio pattern is a defined action by comparing the audio pattern to the binding definitions. If the result of step 99 is NO, then the method proceeds to step 101 to determine if the audio pattern is a phoneme. If the result of step 101 is YES, then the audio pattern is converted to text and provided to the user using conventional speech-to-text conversion methods, step 103. After step 103, the method proceeds to step 105. If the result of step 101 is NO, then the method proceeds directly to step 105.

If the result of step 99 is YES, the audio pattern is a defined action, then in step 107, the method determines from the recipient's input if the recipient user is to be notified of an audio action. If the result of step 107 is YES, then the audio pattern for the action is played to the user, step 109 and the method proceeds to step 111. If the result of step 107 is NO, then the method proceeds directly to step 111.

In step 111, the method determines from the recipient's input if the action is to be converted back into text. If the result of step 111 is YES, then the conversion occurs referring to the binding definitions and the text is displayed to the user, step 113. The method then proceeds to step 115. If the result of step 111 is NO, then the method proceeds directly to step 115.

In step 115, the method determines if the user has requested that the action be executed. This determination is made from an input by the recipient. The recipient can provide that the action will be executed automatically upon its conversion from an audio pattern. Alternatively, the recipient can select the specific action to be executed, as for example, by highlighting the displayed textual action. If the result of step 115 is YES, then the action is executed, step 117. The action is as defined in the binding. Then, in step 119, the method determines if the action has been executed successfully. If the result of step 119 is NO, then the user is notified, step 121, and the method proceeds to step 105. If the result of step 119 is YES, then the execution of the action provides notification to the user and step 121 is bypassed, with the method proceeding to step 105.

If the result of step 115 is NO, there is no request to execute the action, then the method proceeds to step 105.

In step 105, the method determines if the audio pattern that was processed by previous steps is the end of the audio object. If the result of step 105 is YES, then the method stops, step 123. If the result of step 105 is NO, then the method returns to step 97, wherein the next audio pattern is processed.

Thus, with the method of FIG. 4, audio patterns representing actions can be displayed to a recipient user and executed on the recipient's computer. If the recipient wishes to view the action before executing it, then the entire electronic mail object will be displayed. Execution of the action is accomplished by the recipient selecting the displayed action and directing the computer to execute it.

The foregoing disclosure and the showings made in the drawings are merely illustrative of the principles of this invention and are not to be interpreted in a limiting sense.

What we claim is:

1. A method of communicating an electronic mail object from a first data processing system to a second data processing system by way of an audio device, comprising the steps of:
    a) determining if said object includes an action that is executable on said second data processing system;
    b) if said object includes said action, then convening said action into a predetermined audio pattern; and
    c) communicating said audio pattern to said audio device.

2. The method of claim 1, wherein said step of determining if said object includes an action that is executable on a recipient data processing system further comprises the step of parsing through said object.

3. The method of claim 1, further comprising the steps of:
    a) representing said action in said object as text; and
    b) providing cues to separate said action from other portions of said object, which said other portions comprise text.

4. The method of claim 3 wherein said step of determining if said object includes an action that is executable on a recipient data processing system further comprises the step of identifying said action from said cues.

5. The method of claim 3 further comprising the step of, after communicating said audio pattern to said audio device, converting said audio pattern to text.

6. The method of claim 1 wherein said step of communicating said audio pattern to said audio device further comprises the step of communicating said audio pattern over a telephone line.

7. The method of claim 1, further comprising the step of, after said audio pattern is communicated to said audio device, converting said audio pattern into said action.

8. The method of claim 1, further comprising the step of, after said audio pattern is communicated to said audio device, executing said action on said second data processing system.

9. The method of claim 1, wherein said step of determining if said object includes an action that is executable on a recipient data processing system further comprises the step of extracting actions from text portions of said object.

10. A method of communicating an electronic mail object from a first data processing system to a second data processing system by way of an audio device, said electronic mail object having a text portion and an action portion, said action portion having an action executable on said second data processing system, comprising the steps of:
    a) converting said text portion into a first audio pattern;
    b) convening said action portion into a second audio pattern; and
    c) communicating said first and second audio patterns to said audio device.

11. The method of claim 10, further comprising the steps of determining if said action portion is to be correlated with said text portion and, if not, then relocating said second audio pattern so as to be appended to said first audio pattern when said first and second audio patterns are communicated.

12. A method of communicating an electronic mail object from a first data processing system to a second data processing system via an audio device, said object containing an action that is executable on said second data processing system, comprising the steps of:

a) at said first data processing system, converting said action to a predetermined audio pattern that is suitable for communication to said audio device;

b) communicating said audio pattern to said audio device;

c) transferring said audio pattern to said second data processing system from said audio device; and d) at said second data processing system, determining said action from said audio pattern and executing said determined action.

13. An apparatus for communicating an electronic mail object from a first data processing system to a second data processing system by way of an audio device, comprising:

a) means for determining if said object includes an action that is executable on a second data processing system;

b) means for converting said action into a predetermined audio pattern if said object includes said action, said means for converting said action into a predetermined audio pattern being located in said first data processing system; and c) means for converting said audio pattern into said action, said means for converting said audio pattern into said action being located in said second data processing system.

14. The apparatus of claim 13, wherein said means for determining if said object includes an action further comprises means for parsing through said object.

15. The apparatus of claim 13, further comprising:

a) means for representing said action in said object as text; and b) means for providing cues to separate said action from other portions of said object, which said other portions comprise text.

16. The apparatus of claim 15 wherein said means for determining if said object includes an action further comprises means for identifying said action from said cues.

17. The apparatus of claim 15 further comprising means for converting said audio pattern to text, said means for converting said audio pattern to text being located in said second data processing system.

18. The apparatus of claim 13, further comprising, means for executing said action on said second data processing system.

19. The apparatus of claim 13 wherein said means for determining if said object includes an action that is executable on a data processing system further comprises means for extracting actions from text portions of said object.

20. An apparatus for communicating an electronic mail object from a data processing system to an audio device, said electronic mail object having a text portion and an action portion, said action portion having an action executable on a data processing system, comprising:

a) means for converting said text portion into a first audio pattern;

b) means for converting said action portion into a second audio pattern; and c) means for communicating said first and second audio patterns to said audio device.

21. The apparatus of claim 20, further comprising means for determining if said action portion is to be correlated with said text portion and, if not, then for relocating said second audio pattern so as to be appended to said first audio pattern when said first and second audio patterns are communicated.

* * * * *